United States Patent [19]
Adams

[11] 3,789,894
[45] Feb. 5, 1974

[54] STAND FOR MOTORCYCLE WHEELS
[76] Inventor: John Walker Adams, Post Office Box 308, Bar Mills, Maine 04004
[22] Filed: July 20, 1972
[21] Appl. No.: 273,386

[52] U.S. Cl............. 144/288 A, 157/1.22, 269/156, 269/172, 269/296
[51] Int. Cl............................................. B25h 5/00
[58] Field of Search... 269/156, 172, 240, 244, 296; 157/1.17, 1.22; 144/288 A

[56] References Cited
UNITED STATES PATENTS

| | | |
|---|---|---|
| 1,804,222 | 5/1931 | Mascuch.......................... 144/288 A |
| 2,163,469 | 6/1939 | Raschka.......................... 144/288 A |
| 2,873,777 | 2/1959 | Thostenson..................... 144/288 A |
| 1,848,007 | 4/1932 | Gilden............................ 144/288 A |

FOREIGN PATENTS OR APPLICATIONS
670,188    4/1952    Great Britain.................. 144/288 A Primary Examiner—Andrew R. Juhasz
Assistant Examiner—W. D. Bray

[57] ABSTRACT

A stand is disclosed for use in changing motorcycle tires. The stand has three upwardly and outwardly inclined wheel supporting arms, each provided with rim-clamping dog, and a support holding a depending rod in vertical alignment with the center of the stand. One arm has means connected to and operable to move the associated dog into clamping engagement with the rim of the supported wheel and to bring the rim into engagement with the other dogs whose positions may also be shifted as required by the wheel diameter.

5 Claims, 6 Drawing Figures

PATENTED FEB 5 1974 3,789,894
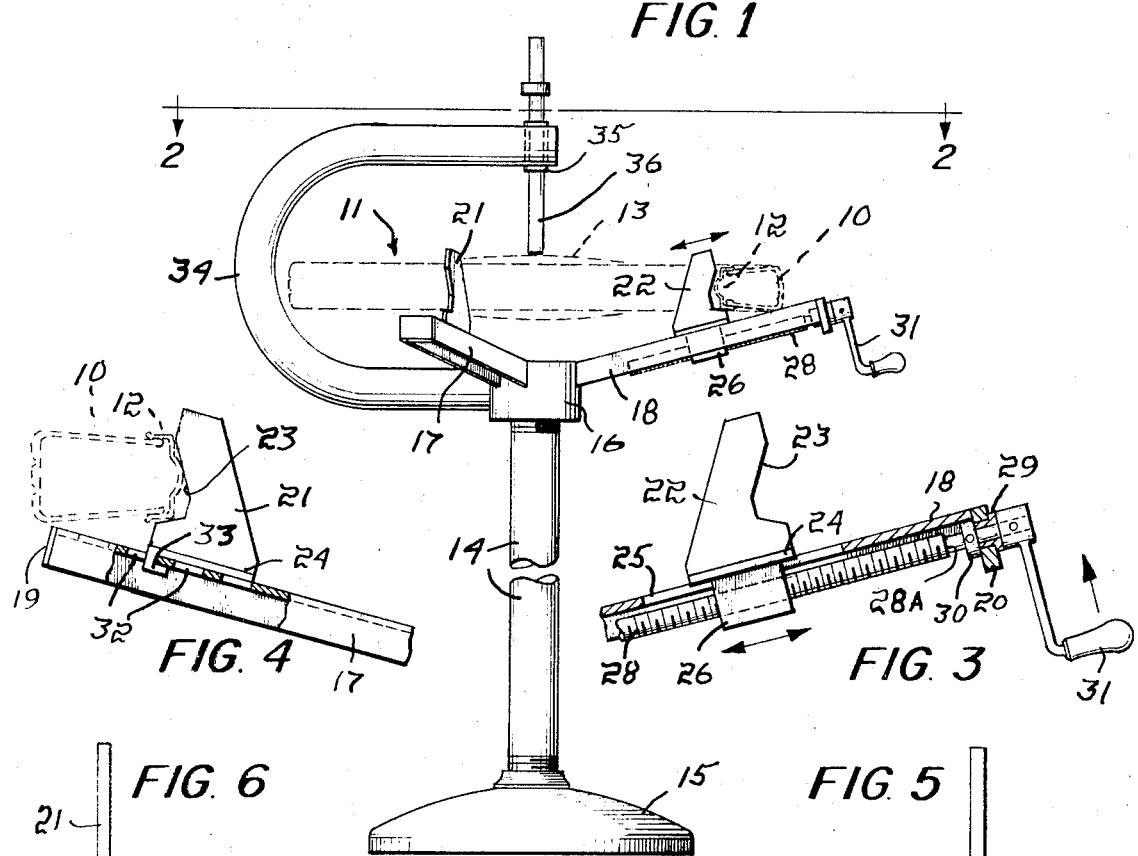
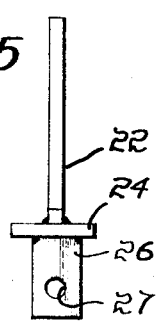
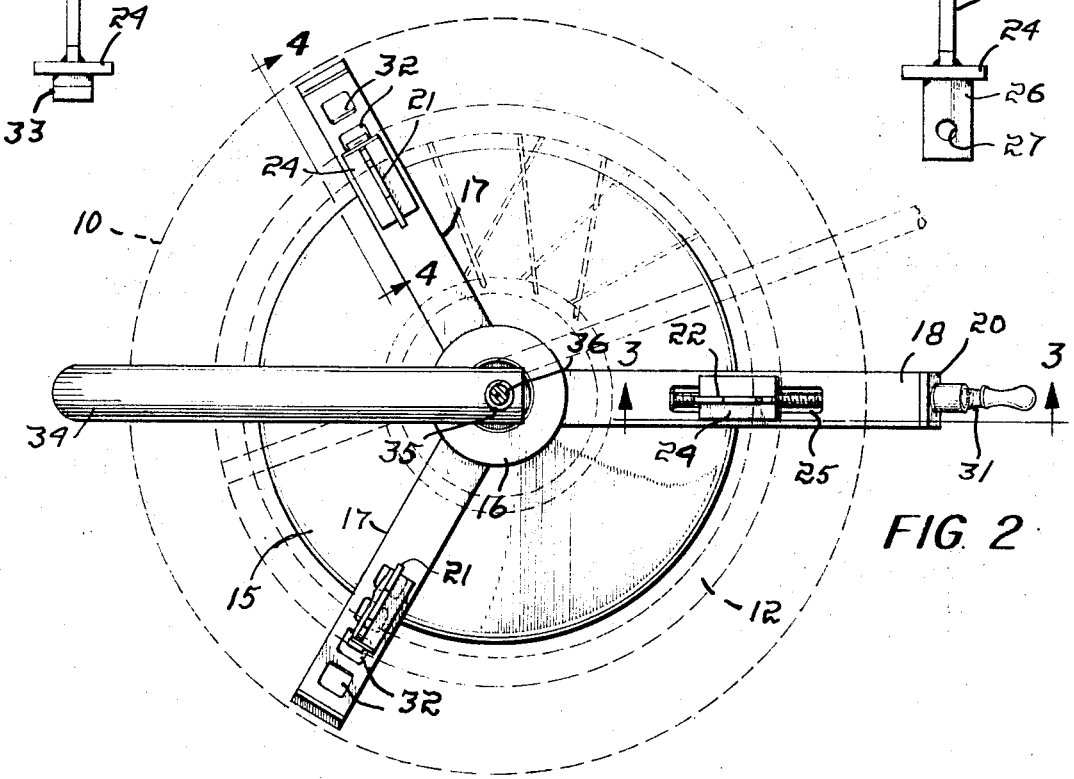

3,789,894

STAND FOR MOTORCYCLE WHEELS

BACKGROUND OF THE INVENTION

It has long been recognized that the changing of tires could be most conveniently and quickly effected if supported by a stand. Stands for use in changing atomobile tires are available but as far as I am aware, none is available or that is adapted for use in the changing of motorcycle tires even though the same procedure must be followed.

In brief, the changing of a tire requires that the wheel be supported so that a tool may be caught under a bead of the mounted tire. In practice, an axial port serves as a fulcrum for the tool so that as the tool is swung, the engaged bead is readily freed from the rim after which the tire may be easily removed.

Motorcycle wheels are troublesome in that they have axially protruding hubs to which their wire spokes are anchored and need to be clamped in position while the above referred to bead-freeing operation is effected and the clamping means must be adapted to engage and hold the rims of wheels of the several sizes, presently 16 to 21 inches in diameter.

Reference is here made to U.S. Pat. No. 996,870 showing a stand provided with means for effecting the clamped support of a tire-supporting rim attachable to a wheel.

THE PRESENT INVENTION

The general objective of the invention is to provide a stand to which the rim of a motorcycle wheel can be clamped in a horizontal position without interference from its hub.

In accordance with the invention this objective is attained with a stand having an upright in support of three arms of a length and spacing such that a motorcycle wheel can be supported in a horizontal position with its axis centrally thereof. Each arm is provided with a clamping dog dimensioned for entry between spokes and to engage the rim of the supported wheel and at least the inner ends of the arms are upwardly and outwardly inclined so that the hub is free. One arm is provided with means connected to its dog and operable to move the dog into and out of clamping engagement with the rim and the rim into clamping engagement with the other dogs. In order that the stand may be used with motorcycle wheels throughout a desired size range, the positions of the dogs relative to their arms may be varied. In addition, the stand has means by which a rod is connected axially thereto in a position serving as a fulcrum for the bead-freeing tool.

BRIEF DESCRIPTION OF THE DRAWINGS

The accompanying drawings illustrate a preferred embodiment of the invention of which FIG. 1 is a side view of the stand;

FIG. 2 is a section taken approximately along the indicated line 2—2 of FIG. 1;

FIG. 3 is a section, on an increase in scale, taken lengthwise of the arm having the adjustable rim-engaging member;

FIG. 4 is a like view of one of the arms with its rim-engaging member in one of its pre-established positions;

FIG. 5 is an end view of the rim-engaging member of FIG. 3; and

FIG. 6 is a like view of the rim-engaging member of FIG. 4.

THE PREFERRED EMBODIMENT OF THE INVENTION

The stand shown in the drawings is for use in changing the tires 10 of motorcycle wheels, generally indicated at 11. Such weeels typically have wire spokes, not shown, interconnecting their rims 12 and their hubs 13 and their diameters vary, with todays motorcycles, from 16 to 21 inches.

The stand has an upright consisting of a post 14 with its lower end threaded into a pedestal 15 and a head 16 threaded on its upper end. The stand also includes three equally spaced, radial arms, a pair of arms 17 and a somewhat longer arm 18, each arm shown as a length of channel stock with its inner end welded to the head 16 and upwardly and outwardly inclined and with its channel downwardly opening. The outer ends of the channels are closed, in the case of its arms 17, by end plates 19 and, in the case of the arm 18 by an end plate 20 dimensioned to extend somewhat beyond the sides thereof for reasons that will presently be apparent.

The arms are provided with clamp dogs for securing the wheel 11 thereto, the dogs 21 in the case of the arms 17 and the dog 22 in the case of the arm 18. The dogs are similar in that each is relatively thin in order that it may pass freely between the spokes and has its outer face provided with a recess 23 establishing a rim-supporting shoulder in a horizontal plane and an outwardly and upwardly inclined rim-clamping shoulder. Each dog also includes a relatively wide base plate 24 seated against the upper surface of its arm.

As it is necessary that the shoulder 23 be in clamping engagement with the rim 12, the dog is adjustable lengthwise of the arm 18. To that end, the arm 18 has a slot 25 of substantial length and the dog 22 has a foot dimensioned to extend through and be a slidable fit in the slot 25. The foot 26 has a bore 27 threaded to receive a threaded rod 28. The outer end 28A of the rod is of a reduced diameter and extends through a flanged bushing 29 in a bore of the end plate 20. Inwardly of the plate 20, the rod end 28A has a collar 30 and a crank 31 is attached on its exposed end.

With the dogs positioned so that they may extend upwardly between the spokes close to the rim 12 when the wheel 11 is placed horizontally on the stand with its axis over that of the post 14, the thus positioned wheel may be clamped in place by turning the crank 31 in the direction appropriate to advance the dog 22 until its shoulder 23 engages the rim 12 and the wheel 11 is shifted so that the rim 12 is drawn into clamping engagement with the shoulders 23 of the dogs 21. It will be apparent that by turning the crank 31 in the opposite direction, the dog 22 is retracted and the wheel 11 is freed.

As previously stated, motorcycle wheels are available in a range of sizes so that, in order to maintain the axes of the wheels substantially coaxial with respect to the axis of the post 14, it is necessary that the dogs 21 also be movable lengthwise of their arms. Each arm 17 has, accordingly, a lengthwise series of transverse slots 32 and the base plate 24 of each dog 21 has a depending hook 33 dimensioned to be inserted through a selected slot 32 and catch on the inner edge thereof thereby to be firmly secured when the wheel 11 is clamped to the arms.

The stand also includes a U-shaped support 34 having its lower arm secured to the head 16 midway between the arms 17 and extending radially outwardly under and beyond the position to be occupied by the largest wheel 11 when supported by the arms of the stand centrally thereof. The upper arm of the support 34 extends radially inwardly to the center of the stand and its free end is provided with a vertical sleeve 35 slidably supporting a headed rod 36 in alignment with the axis of the post 14. The lower end of the rod 36 rests on the uppermost wheel hub 13 and serves as a fulcrum for the tool 36 by which a bead of the tire 10 is freed from its rim 12 of the secured wheel 11.

From the foregoing, it will be appreciated that stands in accordance with the invention are simple and rugged in construction, easily adjustable to different wheel sizes, and ensure that the stand-supported wheels are securely clamped in position while tires are being removed and replaced.

I claim:

1. A stand for use in supporting a motorcycle wheel horizontally during tire removing operations with a tool for unseating a bead of the tire from the rim of the wheel, the wheel of a type having axially projecting hubs, said stand comprising an upright, three radial arms connected to the upper end of said upright, at least the outer ends of said arms extending outwardly and upwardly and of a length and spacing such that a motorcycle weeel can be supported in a horizontal position thereon with its axis overlying the upright and with its lower hub spaced above said upper end a rim-engaging and supporting member carried by the outer end of each arm and dimensioned for upward entry between spokes of the weeel for engagement with the rim and to support the lower side thereof, adjustable means carried by one arm and connected to the rim-engaging and supporting member thereof and operable to move it lengthwise of that arm into and out of a position in which it engages and supports the rim and brings the rim into wheel securing engagement with the other rim-engaging and supporting members, a rod, and means connecting said rod to said upright substantially axially of and above the supported weeel is a position to serve as a fulcrum for said tool.

2. The stand of claim 1 in which the arms are upwardly and outwardly disposed through their entire length.

3. The stand of claim 1 in which the outer edge of each rim-engaging member has a recess defining a lower, rim-supporting shoulder and a vertically spaced, outwardly and upwardly inclined rim-holding shoulder.

4. The stand of claim 1 in which each of the arms is flat surfaced and the arms, other than said one arm that has adjustable means for its rim-engaging and supporting member, have a series of openings spaced lengthwise thereof, one for each wheel size, and each of the rim-engaging and supporting members for said other arms includes a support to seat on said flat surface and provided with a hook adjacent its outer end disposed towards its inner end and dimensioned for entry into a selected one of said openings and catch with the inner edge of the entered opening.

5. The stand of claim 1 in which the outer end of the arm carrying the adjustable means for its rim-engaging and supporting member has a lengthwise slot, the rim-engaging and supporting member of that arm includes a support to seat thereon and a slide entrant of the slot and connected to the adjustable means, and the adjustable means is a screw extending lengthwise and under said arm end, said outer arm end including a holder rotatably supporting the outer end of the screw and said screw is threaded through said slide.

* * * * *